United States Patent [19]

Wolf

[11] 3,824,561

[45] July 16, 1974

[54] APPARATUS FOR ALLOCATING STORAGE ADDRESSES TO DATA ELEMENTS

[75] Inventor: Peter Wolf, Boeblingen, Germany

[73] Assignee: International Business Machines Corporation, Armonk, N.Y.

[22] Filed: Dec. 29, 1972

[21] Appl. No.: 319,566

[30] Foreign Application Priority Data

Apr. 17, 1972 Germany............................ 2218839

[52] U.S. Cl. ............................................. 340/172.5

[51] Int. Cl. .......................... G11c 7/00, G06f 13/00

[58] Field of Search....................... 340/172.5; 444/1

[56] References Cited

UNITED STATES PATENTS

| | | | |
|---|---|---|---|
| 3,299,410 | 1/1967 | Evans | 340/172.5 |
| 3,387,280 | 6/1968 | Bina | 340/172.5 |
| 3,399,394 | 8/1968 | Smith | 340/174.1 |
| 3,694,813 | 9/1972 | Loh et al. | 340/172.5 |

*Primary Examiner*—Paul J. Henon
*Assistant Examiner*—James D. Thomas
*Attorney, Agent, or Firm*—Douglas R. McKenzie

[57] ABSTRACT

A group of variable length data elements are allocated storage addresses by means of apparatus and an associated method, the allocation taking place before the data elements are stored. Characteristic data sets are provided in a main storage which define the characteristics of each data element in the group. The data sets are scanned in two directions. On the first pass, information as to the lengths and boundary requirements of each element are accumulated. On the second pass, addresses are allocated to each element to eliminate gaps in the group while maintaining proper boundary alignment.

5 Claims, 31 Drawing Figures

FIG. 1

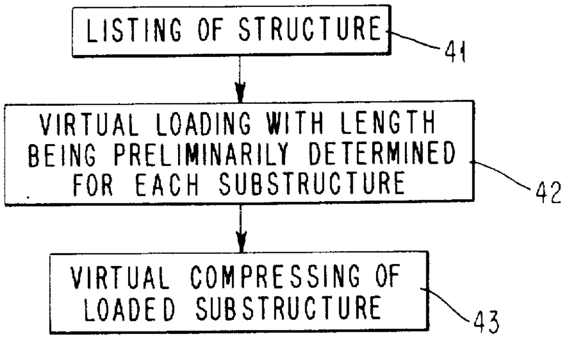

FIG. 2

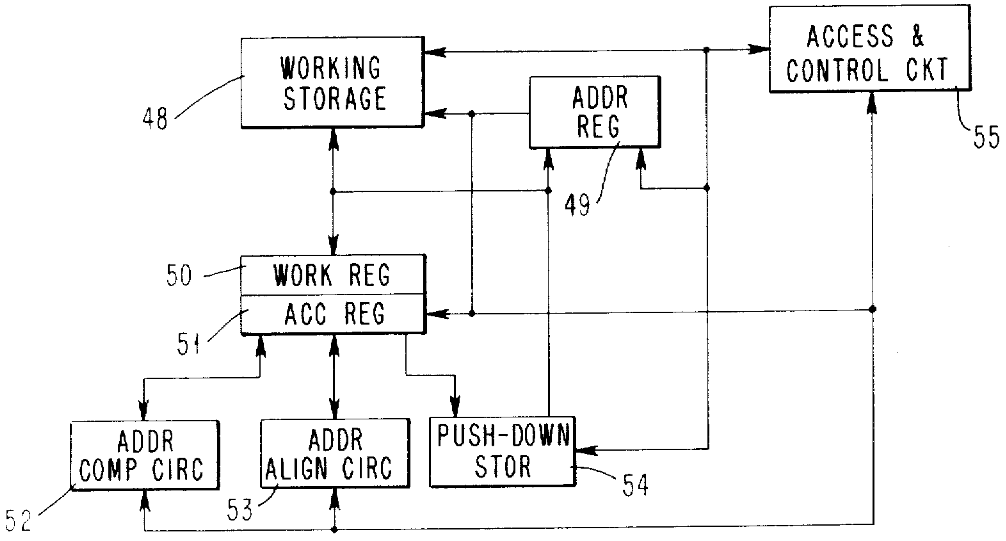

FIG. 3

<table>
<tr><th colspan="6">HIERARCHICAL STRUCTURE</th><th>LEV</th></tr>
<tr><td colspan="6">EMPLOYEE</td><td>1</td></tr>
<tr><td rowspan="3">SRNO</td><td colspan="2">NAME</td><td colspan="3">ADDRESS</td><td>2</td></tr>
<tr><td rowspan="2">CHRISTIAN NAME</td><td rowspan="2">SURNAME</td><td rowspan="2">STREET</td><td colspan="2">PLACE</td><td>3</td></tr>
<tr><td>ZIP</td><td>PLACE NAME</td><td>4</td></tr>
</table>

PATENTED JUL 16 1974 3,824,561

SHEET 06 OF 11

APPARATUS FOR ALLOCATING STORAGE ADDRESSES TO DATA ELEMENTS

SUMMARY OF THE INVENTION

The invention relates to a data processing system. More specifically, it relates to a method and apparatus for automatically allocating storage addresses to a group of variable length data elements.

Data elements are specified in a program of a data processing system according to their form of representation and length. When such elements are assigned real storage addresses, it is essential to observe the storage boundaries on which access to the storage depends. A full data word, for example, whose length is standardized and which consists of 4 bytes, can only be assigned an address starting on a full word boundary. A double word, on the other hand, necessitates an address value coinciding with a double word boundary. When each data element, irrespective of the preceding data element, is associated with its appropriate boundary, considerable storage gaps result between the various data elements, so that the storage space available is inadequately or inefficiently utilized.

A known method of eliminating storage gaps operates in such a manner that after a data element has been associated with its respective storage boundary, all the previously assigned addresses are converted so that figuratively speaking, the existing storage contents are shifted as far as possible towards the new data element (IBM Reference Library — IBM System/360 Operating System, PL/I F, Language Reference Manual, Form No. C 38-8201-2). "As far as possible towards," in this context, means that the results of the conversion meet existing requirements for storage boundaries. In this way the full allocated address area is adjusted to the newly allocated address. As each data element has to be entered separately, this method of storage allocation when used for a great number of data elements entails extensive and time-consuming operations, as final allocation can only be made after the last data element has been processed.

It is an object of this invention to provide an apparatus and a method for substantially reducing the number of computing operations and the time required and necessitating simpler means for its application. To this end, the invention is characterized in that characteristic data sets in a storage are successively scanned, starting with the last element of the group of data elements being processed; that for each characteristic data set the characteristic length value of the associated data element is accumulated and the result value is set to the next boundary corresponding to the characteristic value of the boundary type of this data element; that after the characteristic data set of the first element of the group has been reached, the length of the storage space is determined up to the next boundary of the greatest boundary type within the group, said length being used to determine the fictitious beginning of the group, for which an identification is stored in the characteristic data set of the first element; that during a second scan of the characteristic data sets in the opposite direction the characteristic length values of the various data elements are again accumulated, after each accumulation the result being set to the boundary type to which the respective subsequent element belongs; and that the accumulator value thus corrected is stored as an address value in the characteristic set of said subsequent data element.

An advantageous apparatus for applying the method in accordance with the invention is characterized in that to accommodate the characteristic data sets a storage is provided which is connected to a working register for buffering a characteristic set during the scanning of the latter; than an accumulator register for retaining the length value is provided; and that the storage positions of the working register and the accumulator register are linked with an address computing unit and an address alignment circuit comparing the contents of the accumulator register with the characteristic value of the boundary type, modifying the former according to the difference established.

DESCRIPTION OF THE DRAWINGS

The foregoing and other objects, features and advantages of the invention will be apparent from the following more particular description of a preferred embodiment of the invention, as illustrated in the accompanying drawings.

FIG. 1 is a block diagram of the main phases of the method;

FIG. 2 is a simplified block diagram of apparatus for applying the method of FIG. 1;

FIG. 3 is an example of hierarchically structured data elements;

Figures 4A, 4B, 4C, 4D, 4E, 4F, 5A, 5B, 5C, 5D:
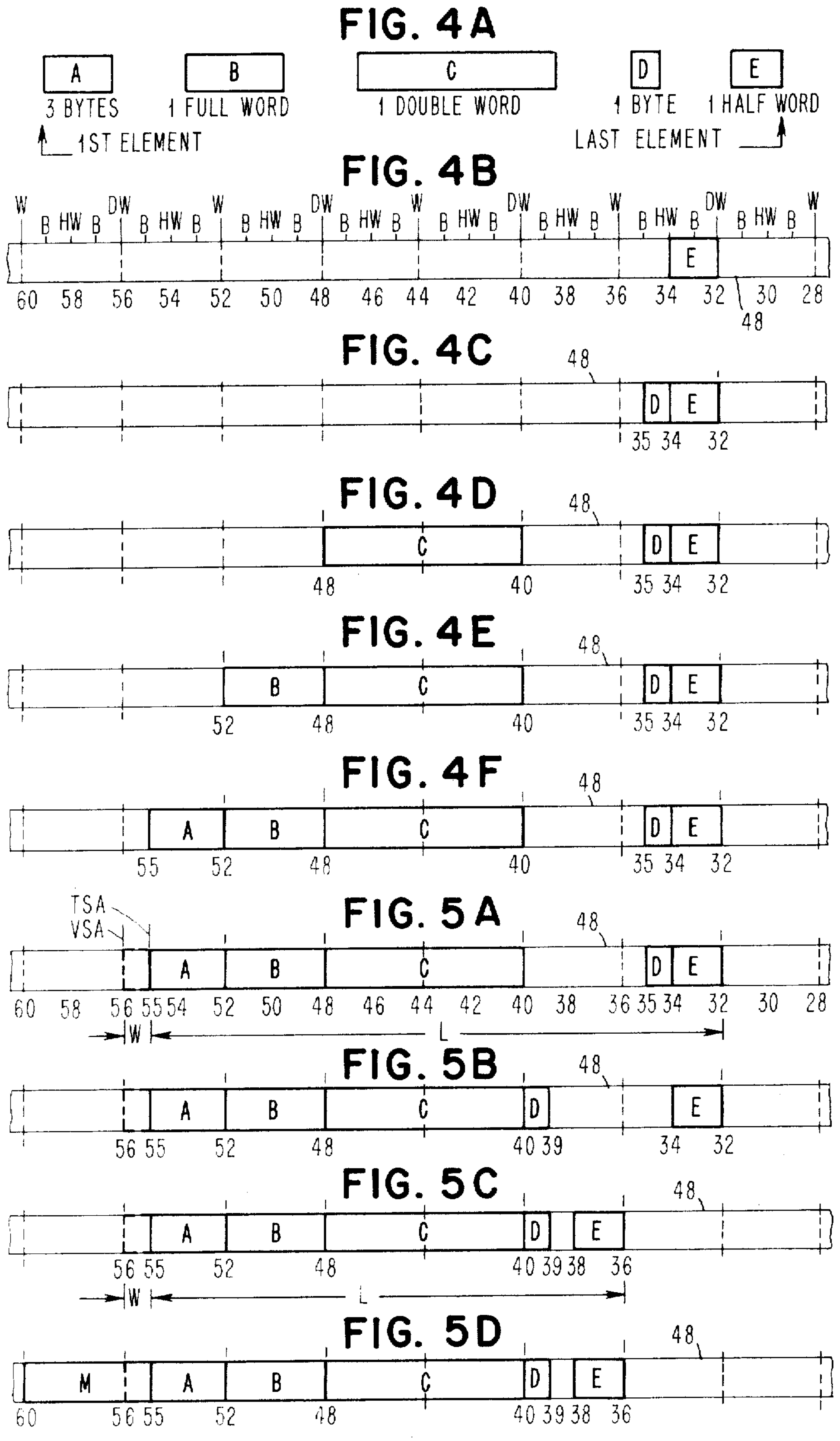
FIGS. 4A to 4F show a diagrammatic representation of the allocation of the data elements to their corresponding boundaries in storage, which serves to explain the load phase of FIG. 1.
FIGS. 5A to 5D show a diagrammatic representation of the change in position of the data elements in storage, which serves to explain the compression phase of the method of FIG. 1.

In the embodiment described below, the terms "structure," "substructure," "set," and "element" play an important role. A structure, in analogy to the same term as used in PL/I, refers to the totality of a number of data words which are hierarchically grouped in relation to each other. A substructure is a group of data words within the structure which have a hierarchy level which is at least lower by 1 than the hierarchy level of the structure. A structure may comprise several substructures, and each substructure may include a random number of further substructures. Each data field within a substructure is referred to as an element of this substructure. By the same token, the substructures within a structure or a substructure are elements of the respective structure or substructure. A set refers to a number of elements of the same hierarchy level, which are formed by individual data fields and substructures.

FIG. 3 shows an example of a four-level structure. The name of the structure is "Employee" which is associated with level 1. At level 2 there is an element designated as "SRNO" (Serial Number) and two substructures referred to as "Name" and "Address." Substructure "Name" comprises two elements "Christian Name" and "Surname" which are both at level 3. The substructure "Address" consists of the element "Street" and the substructure "Place" which are also at level 3. Substructure "Place" consists of two elements "Zip" and Place Name" of level 4. The elements "SRNO," "Name," and "Address" can also be referred to as a set.

Table I shows a structure in accordance with FIG. 3 in PL/I notation, where the digits in brackets specify the length of the elements as the number of bytes which the elements comprise. The letters CHAR indicate that the element is made up of alphanumeric characters, and the description PICTURE '99 . . .' indicates that the element is a numeric number with a number of positions determined by nines.

TABLE I

```
1 EMPLOYEE,
  2 SRNO PICTURE '99999',
  2 NAME,
    3 CHRISTIAN NAME CHAR(10),
    3 SURNAME (15),
  2 ADDRESS,
    3 STREET CHAR(15),
    3 PLACE,
      4 ZIP CHAR(5),
      4 PLACE NAME CHAR(20);
```

Before the data elements are entered into the storage of a data processing system in the described form, they are assigned real storage addresses denoting the storage locations in which the elements are stored and from which they can be retrieved. The storages of data processing systems comprise a particular number of byte storage cells, but these are only addressable in predetermined groups and not individually by means of arithmetic or similar instructions. These groups form so-called physical storage word boundaries which are dependent upon the design of the processing unit. The following subdivision is generally adopted: 1 byte, 2 bytes = 1 half-word, 4 bytes = 1 word, 8 bytes = 1 double word. Processing is effected either in the form of successive half-words, words, or double words, depending upon the design of the system. In order to ensure that only a minimum number of storage accesses is required for the processing of the data elements, it is essential for the beginning of a data element of a particular length to be on a storage boundary corresponding to the length of the data element. Generally, the length of a data element is an integral multiple of the word length to whose boundary type the data element belongs.

FIG. 4A shows a set of five data elements A to E of varying length and belonging to different ones of the above categories. FIGS. 4B to 4F show the storage boundaries which are entered as data elements A to E are stored in storage 40 of a data processing system. The addresses of the represented byte positions of storage 40 are referred to as decimal addresses 28 to 60. Data elements in half-word, full word, and double word format can only be loaded at addresses dividable by two, four, and eight, respectively. In accordance with this, the half-word data element E, for example, is loaded at address 32, and the subsequent 1-byte long element D at the address 34. The following data word element C, however, has to be loaded at double word boundary address 40. Thus, as is shown in FIG. 4D, a 5-byte gap results in storage between element C and element D. Elements B and A are similarly loaded at their respective storage boundaries 48 and 52 without further gaps occurring.

The method in accordance with the invention ensures that storage addresses are allocated to the data elements in such a manner that only very small gaps result between the various elements and that maximum storage occupation is achieved. This type of address allocation is also referred to as the mapping of data elements on the storage space available. The new method is used in particular for mapping and address allocation in structures of the type described above.

FIG. 1 shows the main phase of the method for address allocation to a structure. The first phase which is designated as 41 in FIG. 1 consists in the data elements of the structure being listed in such a manner that the storage address allocation run becomes executable. The second main phase 42 consists in the virtual loading of the data elements into storage. Main phase 43 finally consists in the loaded substructure being virtually compressed. Phases 42 and 43 are repeated for each substructure until the full structure has been mapped in storage.

Figure 6:
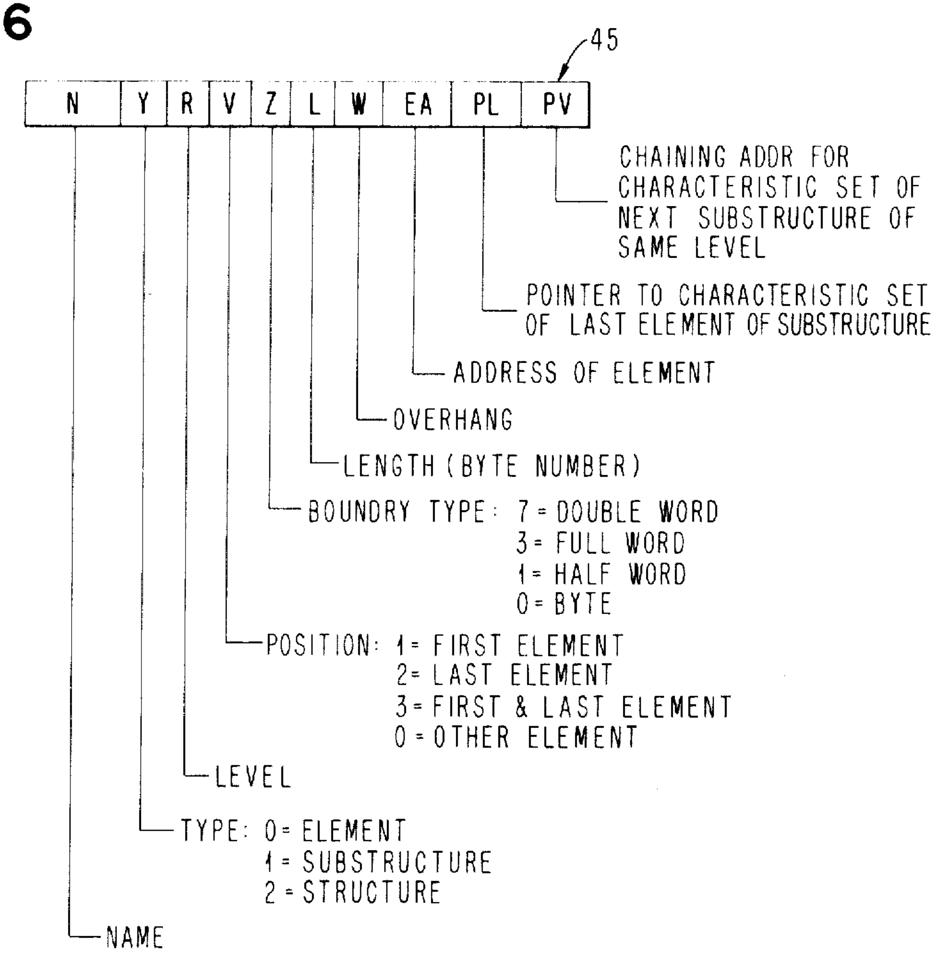
FIG. 6 shows the format of a characteristic data set, as is used in the apparatus of FIG. 2.

For the execution of phases 42 to 43, each element of the structure comprises a characteristic data set which is hereafter referred to as characteristic set and which consists of a number of data words and bytes. The characteristic set contains characteristic data for the respective element of the structure, such as level number, length of element, boundary type, etc. It also serves to accommodate the pointers which are determined during phase 41, as well as the length specifications and the final storage addresses which are determined in phases 42 and 43 of the method. FIG. 6 shows a diagrammatic representation of such a characteristic set, the various components of which are described further on in this specification. The operations necessary for applying the method of address allocation consist in the processing of the characteristic sets. The data elements to which addresses are to be allocated are not affected by this during address allocation. The loading of the elements, which is not an object of the invention, takes place at the real storage addresses as determined after the method has been completed. For this reason the term "virtual" is used in connection with the load and compress operations of phases 42 and 43 as the actual data elements do not leave their physical storage locations during any of these operations.

This should be taken into account when referring to FIG. 5, by means of which phases 42 and 43 are explained below. In accordance with FIGS. 4B to 4F it is assumed that data elements A to E have been virtually loaded into storage. In phase 42 a preliminary value of the total length L of the loaded set of storage elements A to E is determined by accumulating the various element lengths and the remaining gaps (FIG. 5A). Furthermore, overhang W is determined as the distance between element A and the next boundary corresponding to the greatest boundary type of the elements A to E. The greatest boundary type of the elements is associated with a set of elements as its boundary type. In the present case, the boundary type is a double word boundary as the greatest boundary type is predetermined by double word element C. The overhang W is one byte.

FIGS. 5B to 5D refer to phase 43. In this phase the characteristic sets of the various elements A to C are checked for gaps between the virtually loaded elements, allocating to the elements addresses which keep the gaps as small as possible. This condition already exists for elements A to C, so that the next element to be checked is element D. This element consists of one byte, so that it can directly follow element C. Element D is allocated address 39 (FIG. 5B). The same process is repeated for element E. As the latter element is a half-word, address 36 is allocated to the beginning of this element. Address 36 is the half-word boundary which is closest to the end of element D.

From elements A to E in the compressed state the final total length of the set is determined by accumulating the partial lengths. In addition, overhang W is recorded up to the next double word boundary corresponding to the boundary type of the set. As is shown in FIG. 5D this overhang W can be filled with items of an element M which is loaded into storage 48 following element A.

The apparatus used to apply the method comprises in accordance with FIG. 2 a working storage 48 addressable via an address register 49. Working storage 48 is linked with a working register 50 and accumulator registers 51. The apparatus also comprises an address computing unit 52 and an address alignment circuit 53, the inputs and outputs of both of which are connected to registers 50, 51. In addition, the apparatus comprises a push-down listing storage 54 which serves to execute phase 41 (FIG. 1) and which is linked with registers 49 to 51. An access and control circuit 55 serves to control any accesses to storages 48 and 54 and to provide the addresses for register 49. To this end circuit 55 is connected to registers 50, 51. The latter circuit also controls the operations of the address computing unit 52 and of the address alignment circuit 53.

For each structure, substructure and element working storage 48 comprises a characteristic set 45 having a format as shown in FIG. 6. THe characteristic set comprises the fields N, Y, R, V, Z, L, W. EA, PL, PV. The contents of these fields are shown in FIG. 6. Field N contains a name linking up with the actual data element which is associated with an address in field EA as the result of the method. Field Y indicates the type of the characteristic set. A 0 in this field indicates that the characteristic set is associated with an element, a 1 that the characteristic set is associated with a substructure, and a 2 that the characteristic set is associated with a structure. Field R indicates the level number of the element or the substructure. If the characteristic set is associated with the beginning of a structure, field R invariably contains the value 1. Field V indicates the position of the element within a structure and a substructure, respectively, equating the beginning of a structure and a substructure with an element. The first element of a substructure is identified by 1, the last element by 2, a single first and last element by 3, and any other element in field V by 0. Field Z denotes the boundary type, value 7 being indicative of a double word, value 3 of a full word, value 1 of a half-word, and value 0 of a byte. In this connection it is pointed out that the values in the fields of the characteristic set are binarily stored. Thus, the boundary type is represented by the following binary numbers: 111 = double word, 011 = full word, 001 = half-word, 000 = byte. As will be described further on, the next boundary is determined in each case as a function of the specified boundary type, by the last three address positions being masked by binary ones from field Z. If the address field contains zeros in the masked digit positions, it denotes the boundary corresponding to the respective mask value Z.

FIeld L indicates the length of the associated data element in the form of the number of bytes the element comprises. Field W is reserved to accommodate the overhang as previously mentioned in connection with FIG. 5. Field EA serves to accommodate the address of the associated data element, in the embodiment this address being given relative to the beginning of the substructure to which the element belongs. In accordance with this, the first element of a substructure has an EA value of zero. Field PL, which serves to accommodate a pointer to the characteristic set of the last element of the substructure during listing phase 41, is only occupied in the case of characteristic sets associated with a substructure. Field PV, on the other hand, accommodates a chaining address to the characteristic set of the preceding substructure of the same level. This element, too, is only occupied in the case of characteristic sets associated with a substructure, however, subject to the respective substructure forming a common level with other substructures within the structure.

The characteristic sets of FIG. 6 are stored in working storage 48 in the order in which the various elements and substructures occur within a structure and are transferred to working register 50 under the control of circuit 55 to store certain characteristic values in the accumulator registers 51 and to process them in circuits 52 and 53. Before reading in each case the next characteristic set, the characteristic set stored in working register 50 is transferred back to storag 48 either unchanged or after particular ones of its fields have been updated.

Listing of the structure.

In the following, the various steps executed during listing phase 41 are described by means of FIGS. 6 and 8A to 8C. It is assumed that the method is to be used for the structure in accordance with Table II:

TABLE II

1 S
  2 A
  2 U1
    3 B
    3 U2
      4C

4 D
2 U3
3 U4
4 E
4 F
3 G
3 U5
4 H
4 I

The structure serving as an example is designed as S and comprises five substructures U1 to U5 and elements A to I. Only element A which is at level 2 does not belong to a substructure. The following expression where the digits above the brackets indicate the level of the respective substructures can also be used for this structure:

```
1     2     3            2     3           3
( A   ( B   ( C D ) )    (     ( E F ) G   ( H I ) ) )
S     U1    U2           U3    U4          U5
```

Figure 8D:
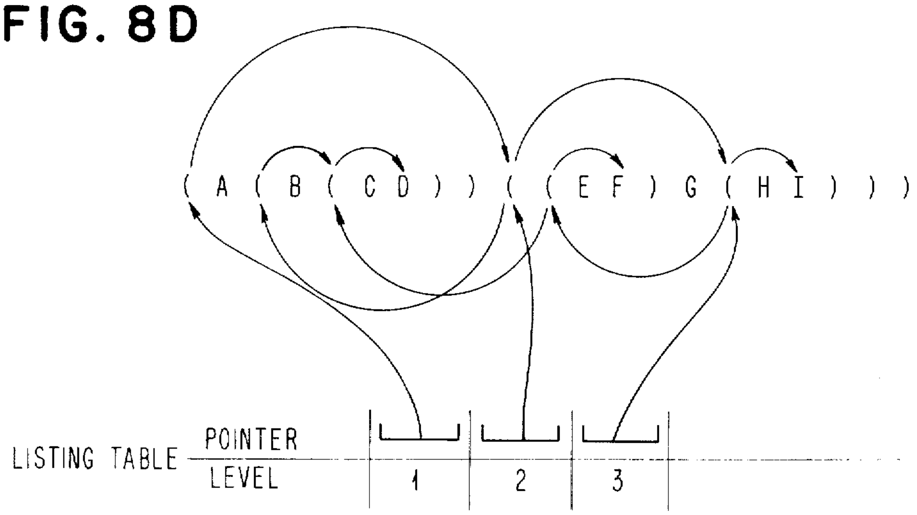
FIGS. 8A to 8D show a diagrammatic representation serving to explain the listing step of FIG. 7.
Figure 8A:
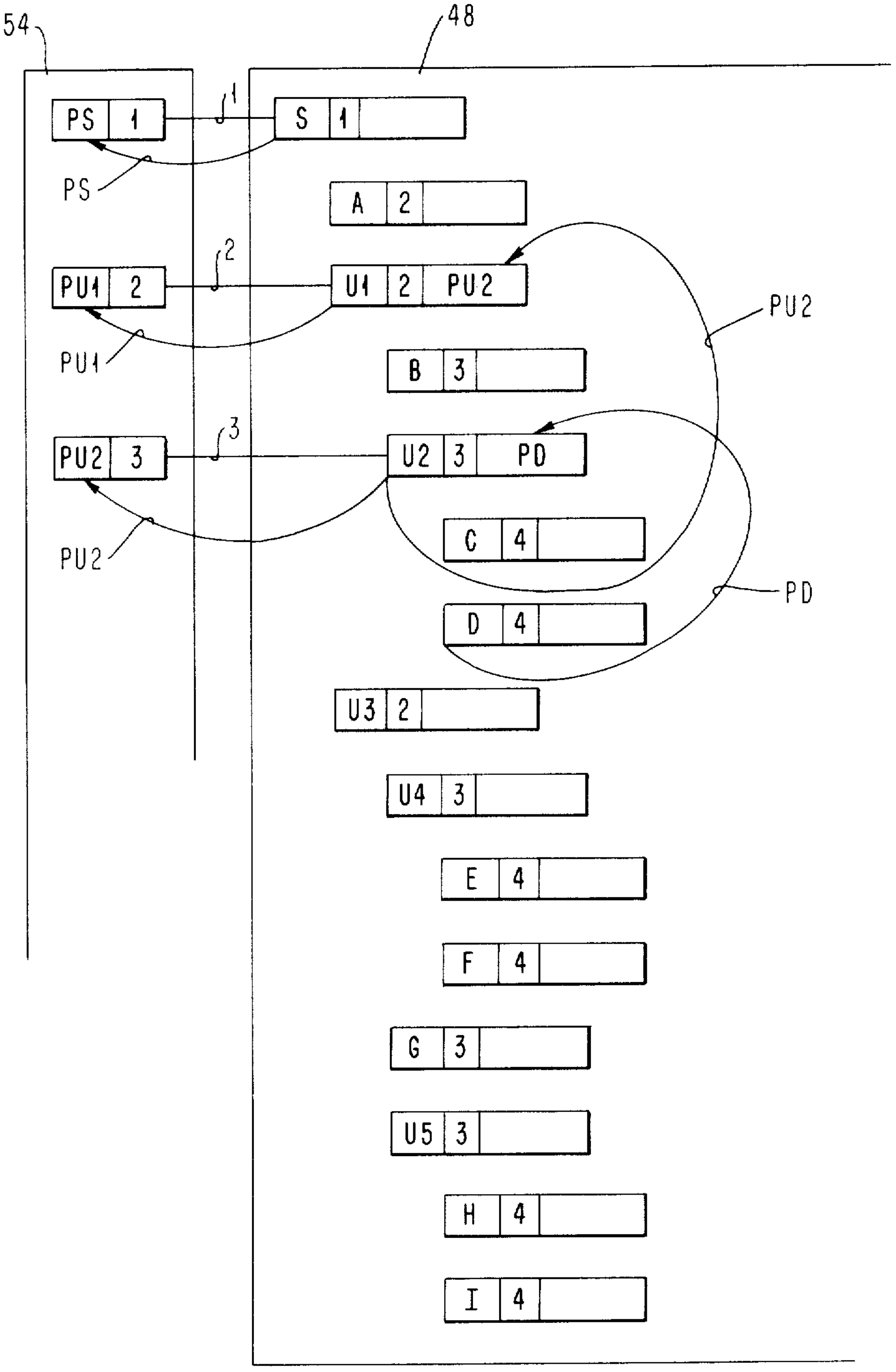

The diagrammatic representation of FIG. 8A shows working storage 48 in the state after the characteristic sets of structure S have been loaded. The simplified characteristic sets as shown merely comprise a name field and a level field as well as a further field into which the pointers and chaining addresses formed during the listing phase are entered. The characteristic sets are loaded into storage 48 in a known manner, so that the loading step is not an object of this invention.

The listing phase 41 consists in the various characteristic sets, starting with the first set of the structure, being successively transferred from working storage 48 to working register 50 to be subsequently checked to determine whether they denote the beginning of a structure or a substructure. The characteristic sets in working storage 48 are invoked as a function of control circuit 55 comprising an address incrementation unit known per se and by means of which the contents of address register 49 are set to the next characteristic set. For each characteristic set for which the check of field V (FIG. 6) determines the beginning of a structure or substructure an entry is made into push-down storage 54. The design of this storage is known per se. Push-down storage 54 works to the "last in/first out" principle. Entries into push-down storage 54 are made by transferring the contents of address register 49 to the input of the push-down storage where they are stored as the last input value. The latter value invariably corresponds to the lowest hierarchy level of the part of the structure already processed. As is shown in FIG. 8A, the address PS of characteristic set S in storage 48 is transferred as the first input value to push-down storage 54. Thus, this value corresponds to level 1. As the characteristic set of substructure U1 is scanned, its address PU1 is transferred as a second input value to the push-down storage. This input value corresponds to level 2. Similarly, address PU2 of characteristic set U2 is transferred as the third input value to the push-down storage. As characteristic set U2 is scanned, it is determined by means of the contents of field V (FIG. 6) that this characteristic set is associated with the last element of a substructure. This leads to address value PU1 stored last in push-down storage 54 being read and being used to search characteristic set U1 in main storage 48 by means of access and control circuit 55. Subsequently, pointer PU2 to the characteristic set of substructure U2 is stored in field PL of characteristic set U1. The same operations are repeated for characteristic set D. By checking field V it is determined that a "last" element is present. The entry of the next higher level, namely, address PU2, is read from push-down storage and is used to search characteristic set U2, into field PL of which address PD is subsequently entered.

Figure 8B:
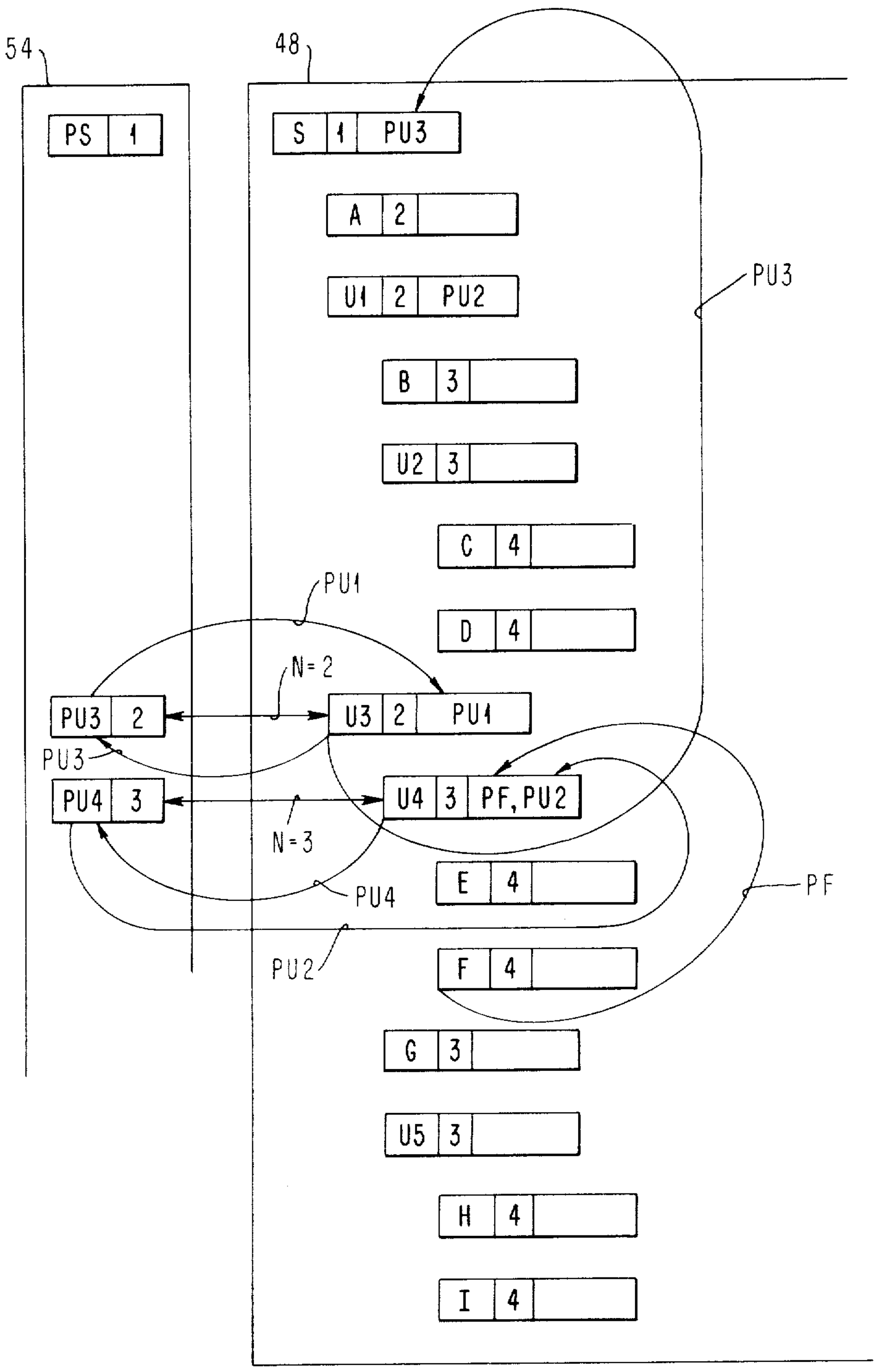
Figure 8C:
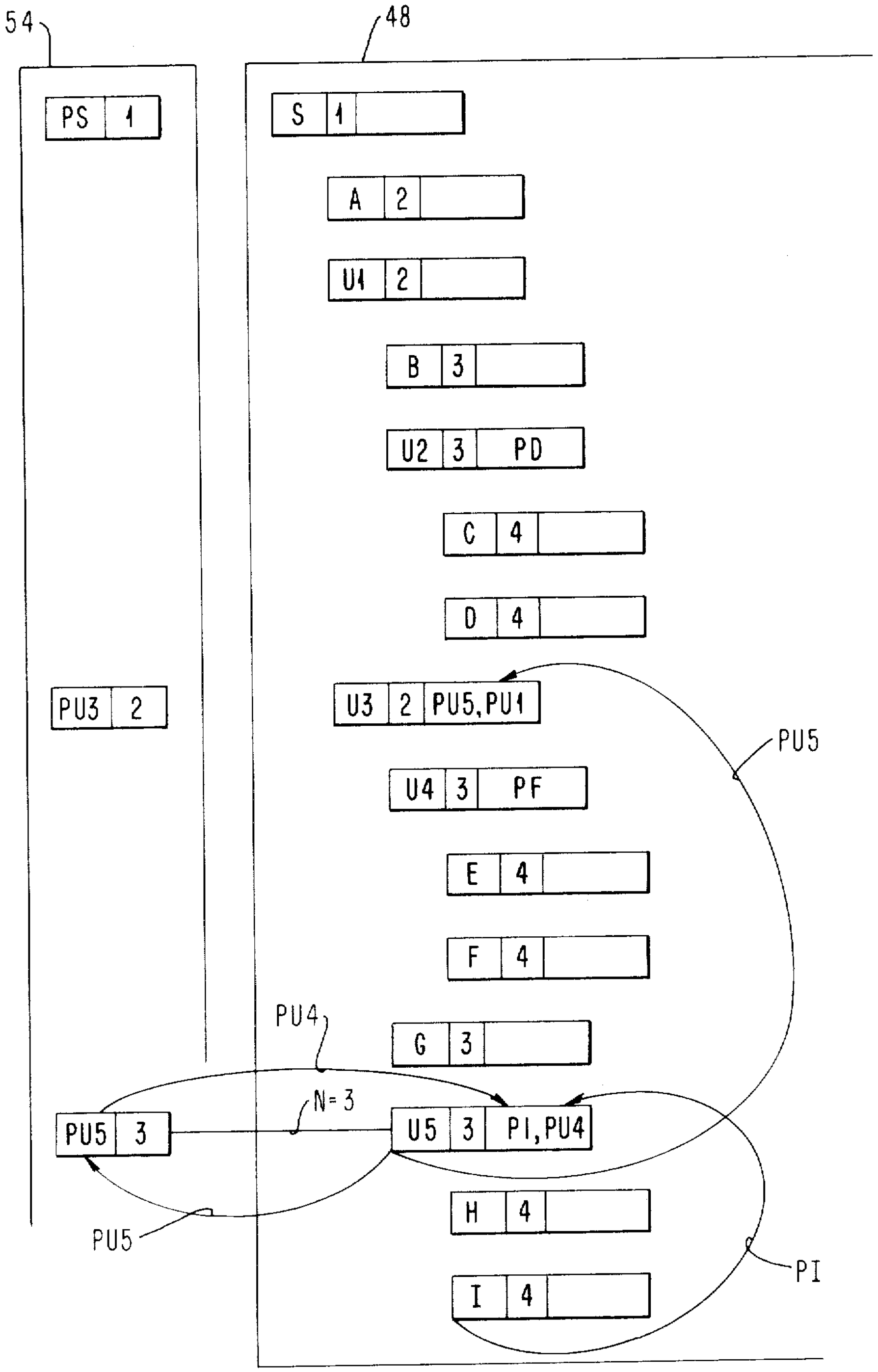

Then the listing operation continues with characteristic set U3 (cf. FIG. 8B). A comparison of the contents of field R of this characteristic set, which contains the value 2, with the current address status of push-down storage 54 shows that the latter already contains a structure of the same level as the last entry in push-down storage belonged to level 3. By means of level number 2, as an address, pointer PU1 is read from push-down storage and entered as a chaining address into field PV of characteristic set U3. In push-down storage address PU1 is replaced by address PU3 of characteristic set U3. During the scanning step of characteristic set U3 it is also determined that U3 is the last element of S, so that PU3, in the manner described, is entered into field PL of the characteristic set of S. After these operations are completed, characteristic set U4 is scanned. Address PU2 of level 3, which is the third entry in the push-down storage in accordance with FIG. 8A, is transferred to chaining address field PV of characteristic set U4, being replaced in push-down storage by address PU4. As scanning progresses, it is determined by means of characteristic set F that the latter is the last set of substructure U4. Subsequently, address PF of characteristic set F is transferred, as shown in FIG. 8A, to pointer field PL of characteristic set U4. The listing operations continue by scanning characteristic set G (FIG. 8C). As characteristic set U5, belonging to level 3, is scanned it is again determined by comparing the number of entries in push-down storage 54 that the latter already contains an entry of the same level, namely, address PU4. This address is then transferred to field PV of characteristic set U5, address PU5 of this characteristic set replacing entry PU4 in push-down storage 54. Address PU5 is also transferred to field PL of characteristic set U3 as substructure U5 is the last element of substructure U3. As scanning progresses, it is determined by means of characteristic set I that the latter is the last characteristic set of substructure U5. Therefore, address PI of this characteristic set is transferred in the manner described to field PL of characteristic set U5 of this substructure.

Upon reaching characteristic set I the listing phase is completed. Push-down storage 54 subsequently contains the working storage addresses of the characteristic sets of the last substructures of each level. It also contains as a first entry the address of the characteristic set of the structure. In working storage 48 the characteristic sets of the last substructures of each level contain chaining addresses to the characteristic sets of preceding substructures of the same level. By means of chaining addresses the latter characteristic sets argain connected to preceding characteristic sets of the same level. The characteristic set of each substructure also contains the address of the last element of the structure. The result of this is a network of pointers, which is diagrammatically represented in FIG. 8D. The described addressing pattern is a prerequisite for the execution of load phases 42.

Load Phase

In the load phase 42, the characteristic sets, starting with the last element of the substructure, are scanned via each substructure to accumulate the length values contained in the characteristic sets, observing, in accordance with FIGS. 4B to 4F, the boundaries each data element requires during storage allocation. Following this step, overhang W is determined for the respective substructure, being subsequently stored in the appertaining field in the characteristic set of this substructure. For the structures of Table II these operations are explained below by means of FIGS. 2, 7, 9, and 10. In step 66 (FIG. 7), the characteristic set of the substructure which was the last to be processed during the listing phase at the lowest hierarchy level of structure S is read first. The structure concerned is structure U5. The characteristic set of this structure is obtained by the last entry, namely, address PU5, in push-down storage 54 being read out.

This address is transferred to address register 49, serving, controlled by access and control circuit 55, to search the characteristic set of substructure U5 in working storage 48. This characteristic set which contains the pointer PI to the characteristic set of the last element I of substructure U5 is transferred to working register 50. Pointer PI is transferred from working register 50 to address register 49, serving in connection with circuit 55 to address in and read from working storage 48 the characteristic set for element I. This operation corresponds to step 67 in FIG. 7. The characteristic set of element I replaces the characteristic set of substructure U5 in working register 50.

Then step 68 is executed in which the rough length of the substructure is determined. For this purpose accumulator registers 51 are used which are shown as separate registers 61 to 64 in FIG. 9. Accumulator register 61 serves to accommodate the current length value; this register is also referred to as accumulator register C. Register 62 in which overhang W' of the respective substructure is determined is used to accommodate the current overhang value. Register 63 serves to form the characteristic value Z' for the boundary type of the substructure. Register 64 is an auxiliary register which is used to buffer the length value and which is also referred to as X-register. Before step 68 is executed, registers 61 to 64 are set to zero in step 65.

Figure 9:
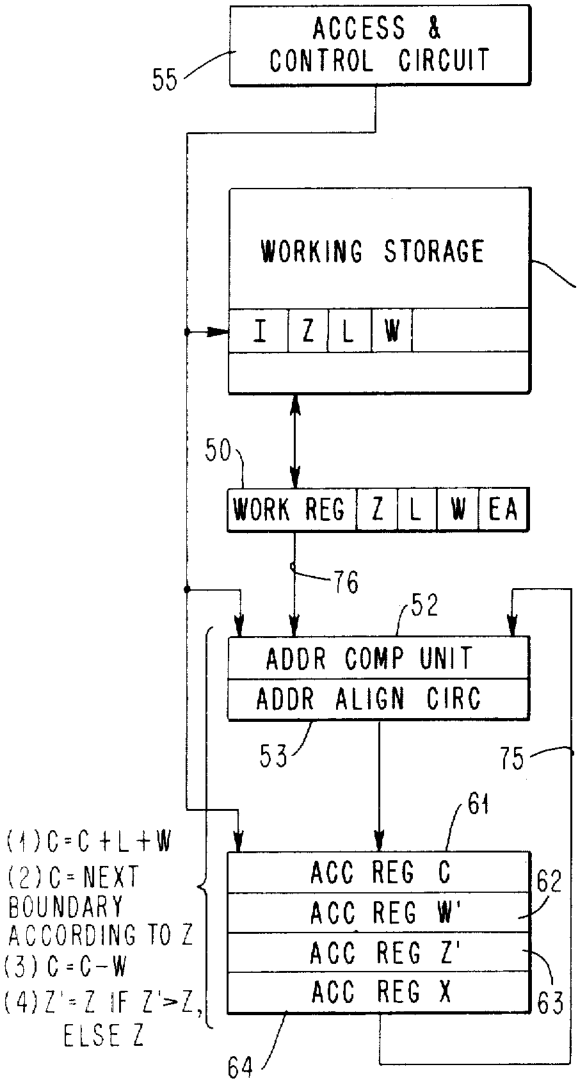
FIG. 9 is a block diagram showing in detail the load phase and the determination of the length to the method of FIGS. 1 and 7.
Figure 10:
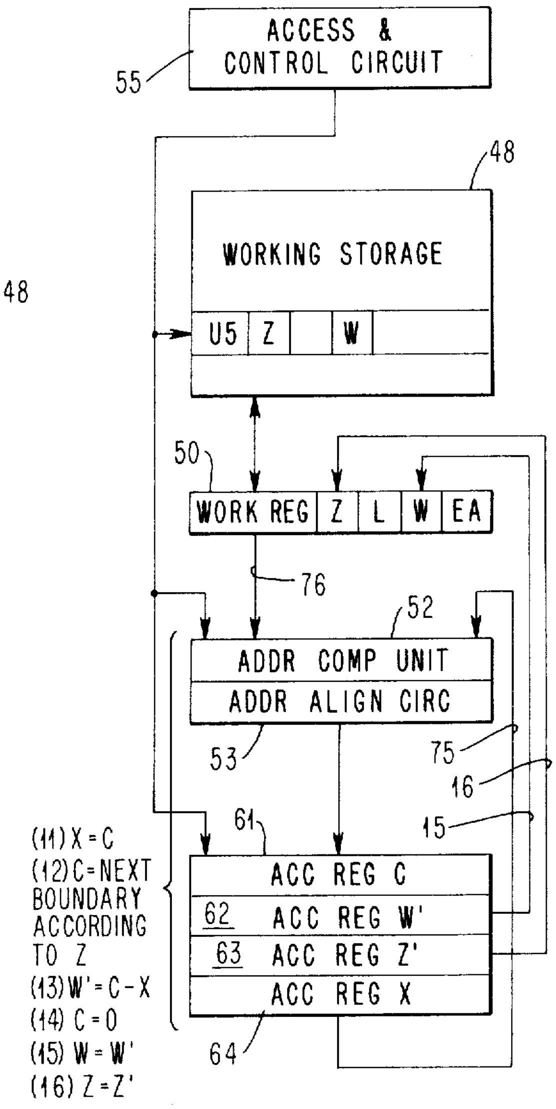
FIG. 10 is a block diagram showing in detail the determination of the "overhang" of FIG. 7.

FIG. 9 also shows the working storage 48, the working register 50, the address computing unit 52, the address alignment circuit 53, and the access control as a part of circuit 55. Registers 50 and 61 to 64 are connected to each other as well as to address computing unit 52 and to address alignment circuit 53 via gate circuits (not shown) which for value transmissions between the said register and computing circuits are clock pulse actuated in the required order in a manner known per se. To this end the individual fields, such as Z, L, and W, in register 50 are separately addressable in a manner known per se for the reading and writing of values. Computing unit 52 has the characteristics of an arithmetic and logical unit which can be selectively controlled for add, subtract, or logical operations, such as, value comparisons.

In partial step 68 the following computing steps are repeated for each element of the substructure:

1. C = C + L + W
2. C = next boundary in accordance with Z
3. C = C − W
4. Z' = Z' if Z'>Z, else Z The above expressions have a meaning similar to the assignment statements in PL/I. The "=" sign serves two functions: on the one hand, it is used as an equal sign in the algebraic sense and on the other it is used as an assignment operator. Thus, the expression C = C + L + W means that the sum of the values C, L, and W is to be formed and to be transferred to C. As C is the accumulator register 61 this means in other words that the values L and W are to be added to the current contents of these registers.

As previously mentioned, the execution of step 68 begins with the characteristic set of element I. FIG. 9 shows that this characteristic set was selected by access control 55 in storage 48. Although for step 68 merely the values Z, L, and W of this characteristic set are essential, the full characteristic set is transferred to working register 50. Then partial step (1) is executed, during which in computing unit 52 value C, applied to one computing unit input via link 75, and characteristic value L, transferred from register 50, via link 76, to the other input of computing unit 52, are added together. The same step is repeated for characteristic value W. Subsequently, partial step (2) is executed, during which the next boundary corresponding to characteristic value Z in the working register is determined from the contents of register 61. To this end value C in register 61 is incremented, while the last three positions of this value are masked by the value Z until all masked value positions contain a zero. This process is described in detail below. The next partial step (3) causes the characteristic value W to be subtracted from the new contents of register 61. In partial step (4) the computing unit 52 compares value Z' from register 53 with characteristic value Z in working register 50. In register 63 value Z' is replaced by value Z if the latter exceeds value Z'. If not, value Z' remains unchanged.

TABLE III

| N | Y | R | V | Z | L | W | EA | PL | PV |
|---|---|---|---|---|---|---|---|---|---|
| S | 2 | 1 | 3 | | | | | PU3 | |
| A | 0 | 2 | 1 | 0 | 6 | | | | |
| U1 | 1 | 2 | 0 | | | | | PU2 | |
| B | 0 | 3 | 1 | 3 | 8 | | | | |
| U2 | 1 | 3 | 2 | | | | | PD | |
| C | 0 | 4 | 1 | 0 | 1 | | | | |
| D | 0 | 4 | 2 | 7 | 8 | | | | |
| U3 | 1 | 2 | 2 | | | | | PU5 | PU1 |
| U4 | 1 | 3 | 1 | | | | | PF | PU2 |
| E | 0 | 4 | 1 | 1 | 2 | | | | |
| F | 0 | 4 | 2 | 1 | 2 | | | | |
| G | 0 | 3 | 0 | 0 | 1 | | | | |
| U5 | 1 | 3 | 2 | 7 | | | | PI | PU4 |
| H | 0 | 4 | 1 | 7 | 64 | | | | |
| I | 0 | 4 | 2 | 0 | 57 | | | | |

Tables III and IV serve to explain the above partial steps in greater detail. For structure S Table III shows a numerical example depicting the contents of the characteristic sets of this structure in working storage 48. The table shows, amongst others, that I is an element (Y = 0) belonging to boundary type Z = 0 and having a length of 56 bytes. As the elements per se have no overhang, characteristic field W contains a 0 in the characteristic set for element I. Table IV shows the six processing cycles (*a*) to (*f*), during which the five substructures and eventually the said structure are processed. Fields (*a*) to (*f*) associated with the processing cycles are subdivided into three parts. The contents of the characteristic sets, without fields PL and PV, are represented by the first part as the contents of accumulator registers 61 to 64 during the load phase in accordance with steps 68, 69, whereas the third part (on the very right) depicts the contents of C-register 61 during the compress step 69. The arrows in the second and third part indicate the direction of processing.

TABLE IV

| | N | Y | R | V | Z | L | W | EA | | C | X | W' | Z' | | C |
|---|---|---|---|---|---|---|---|---|---|---|---|---|---|---|---|
| (a) | U5 | 1 | 3 | 2 | 7 | 121 | 0 | | ↑ | 128 | 128 | 0 | 7 | ↓ | |
| | H | 0 | 4 | 1 | 7 | 64 | 0 | 0 | | 128 | 0 | 0 | 7 | | 0 |
| | | | | | | | | | | (121) | | | | | |
| | I | 0 | 4 | 2 | 0 | 57 | 0 | 64 | | 57 | 0 | 0 | 0 | | 64 |
| | | | | | | | | | | | | | | | 121 |
| (b) | U4 | 1 | 3 | 1 | 1 | 4 | 0 | | ↑ | 4 | 4 | 0 | 1 | ↓ | |
| | E | 0 | 4 | 1 | 1 | 2 | 0 | 0 | | 4 | 0 | 0 | 1 | | 0 |
| | F | 0 | 4 | 2 | 1 | 2 | 0 | 2 | | 2 | 0 | 0 | 1 | | 2 |
| | | | | | | | | | | | | | | | 4 |
| (c) | U2 | 1 | 3 | 2 | 7 | 9 | 7 | | ↑ | 16 | 9 | 7 | 7 | ↓ | |
| | C | 0 | 4 | 1 | 0 | 1 | 0 | 0 | | 9 | 0 | 0 | 7 | | 0 |
| | D | 0 | 4 | 2 | 7 | 0 | 0 | 1 | | 8 | 0 | 0 | 7 | | 1 |
| | | | | | | | | | | | | | | | 9 |
| (d) | U3 | 1 | 2 | 2 | 7 | 127 | 2 | | ↑ | 136 | 134 | 2 | 7 | ↓ | |
| | U4 | 1 | 3 | 1 | 1 | 4 | 0 | 0 | | 134 | 0 | 0 | 7 | | 0 |
| | | | | | | | | | | (133) | | | | | |
| | G | 0 | 3 | 0 | 0 | 1 | 0 | 4 | | 129 | 0 | 0 | 7 | | 4 |
| | U5 | 1 | 3 | 2 | 7 | 121 | 0 | 6 | | 128 | 0 | 0 | 7 | | 6 |
| | | | | | | | | | | (121) | | | | | 127 |
| (e) | U1 | 1 | 2 | 0 | 7 | 20 | 4 | | ↑ | 24 | 20 | 4 | 7 | ↓ | |
| | B | 0 | 3 | 1 | 3 | 8 | 0 | 0 | | 20 | 0 | 0 | 7 | | 0 |
| | | | | | | | | | | (17) | | | | | |
| | U2 | 1 | 3 | 2 | 7 | 9 | 7 | 11 | | 9 | 0 | 0 | 7 | | 11 |
| | | | | | | | | | | (16) | | | | | 20 |
| (f) | S | 2 | 1 | 3 | 7 | 155 | 6 | | ↑ | 168 | 162 | 6 | 7 | ↓ | |
| | A | 0 | 2 | 1 | 0 | 6 | 0 | 0 | | 162 | 0 | 0 | 7 | | 0 |
| | | | | | | | | | | 156 | | | | | |
| | U1 | 1 | 2 | 0 | 7 | 20 | 4 | 6 | | (158) | 0 | 0 | 7 | | 6 |
| | | | | | | | | | | 134 | | | | | |
| | U3 | 1 | 2 | 2 | 7 | 127 | 2 | 28 | | (129) | 0 | 0 | 7 | | 28 |

As field (*a*) of Table IV shows, C-accumulator register 61 contains the value 57 after characteristic set I has been processed in partial steps (1) to (4), whereas registers 62 to 64 remain in the zero state. Subsequently, the characteristic set for element H is transferred to working register 50 by access control 55, repeating for this characteristic set partial steps (1) to (4) as described. In partial step (1) length value 64 from characteristic field L of characteristic set H is added to length value 57 in register 61, so yielding value 121 as the new contents of register 61. As element H belongs to boundary type 7 (double word), partial step (2) leads to the contents of the accumulator to be incremented by 7 to the value 128 which after 121 represents the next double word boundary. During partial step (3) value C in register 61 remains unchanged. In partial step (4) it is determined that value Z' is lower than Z = 7 in the characteristic set of element H, so that the contents of Z'-register 63 are replaced by the value 7.

As element H is the first element of substructure U5, this being determined by means of field V in working register 50, step 68 (FIG. 7) is completed, and step 69 determining the overhang of the substructure is executed. This step is explained by means of FIG. 10, using the same reference numbers as in FIG. 9 for identical circuit components. Step 69 consists of the following partial steps:

11. X = C
12. C = next boundary in accordance with Z'
13. W' = C − X
14. C = 0
15. W = W'
16. Z = Z'

In partial step (11) the contents 128 of C-accumulator register 61 is buffered in X-register 64. In partial step (12) the contents of the accumulator are incremented to the next boundary in accordance with characteristic value Z' from register 63. As 128 is a double word boudnary, value C remains unchanged in the example. Partial step (13) provides for the contents of register 64 to be subtracted from the contents of value C in register 61 and to be stored as overhang value W' in register 62. In the example the value yielded for W' is 0. In partial step (14) C-register 61 is erased. Partial step (15) results in the contents of W'-register 62 being transferred to field W of working register 50, whereas step (16) causes the contents of Z'-register 63 to be transferred to the Z-field of working register 50. In connection with the characteristic set of the substructure the operations of partial steps (11) to (16) are performed once per substructure. Thus, in the example of Table IV the value 0 appears in field W of characteristic set U5 to indicate that no overhang exists for the substructure. Value 7 appears in field Z to indicate that substructure U5 belongs to boundary type 7 which is determined by the boundary type of element H.

Figure 11:
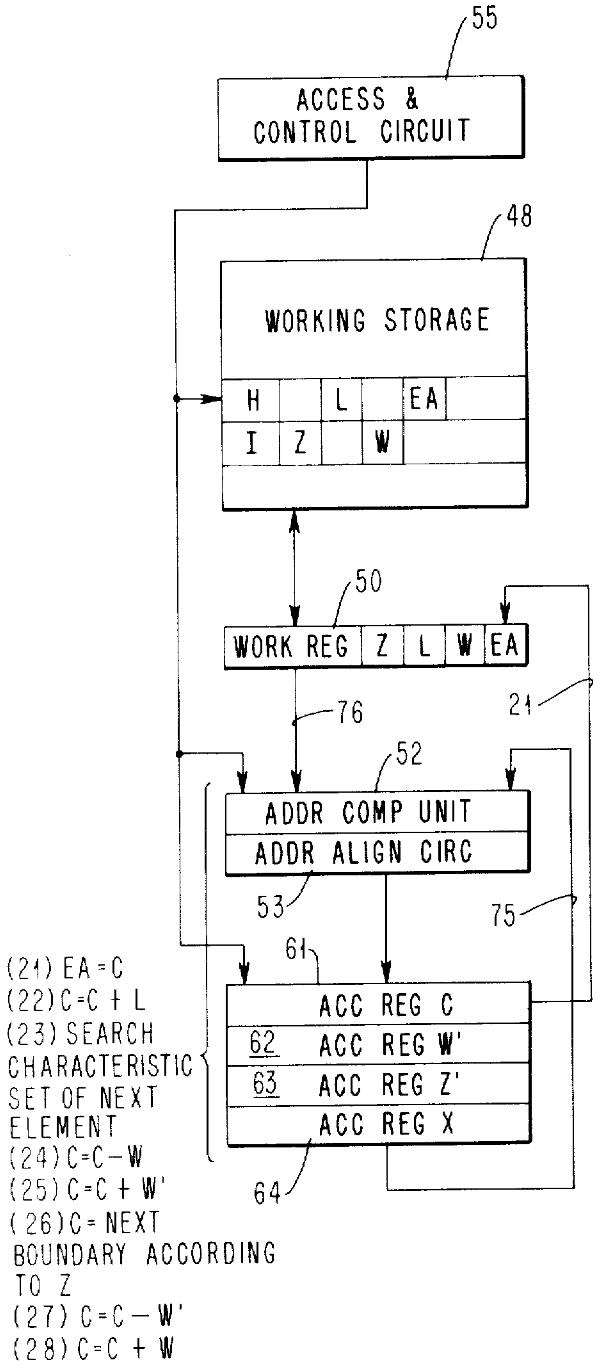
FIG. 11 is a block diagram showing in detail the compression phase and the formation of the storage addresses by means of the method of FIGS. 1 and 7.

This completes step 69 for substructure U5 and step 70 begins which causes the gap existing between the addresses of elements H + I in the length value buffered in register 64 to be eliminated and storage addresses EA for the elements of the corresponding substructures to be formed. This step is repeated for the various elements of the substructure being processed, starting in each case with the first element. FIG. 11 serves to provide further details. Step 70 comprises the following partial steps which are repeated for each element of the structure:

21. EA = C
22. C = C + L
23. Search characteristic set of the next element
24. C = C − W
25. X = C + W'

26. X = next boundary in accordance with Z
27. C = X − W′
28. C = C + W

For element H which is the first element of the processed substructure U5 these partial steps are explained by means of FIG. 11 and field (*a*) of Table IV. Access control 55 causes the characteristic set of this element in working storage 48 to be addressed and the characteristic set to be transferred to working register 50. In partial step (21) the contents of C-accumulator register 61 are transferred to field EA of working register 50. This field is associated with the element address of element H. In each case an element address is formed as a relative address to the first element of the substructure being processed. As element H is such a first element its address is 0. Partial step (22) causes L-value 64 from working register 50 to be added to the contents of C-accumulator register 61, so yielding a preliminary address value 64 for the next element which may have to be updated, depending upon the boundary type of the element. In partial step (23) the characteristic set of the next element I is addressed by access control 55 and is transferred from storage 48 to the working register. Prior to this, the updated characteristic set of element H from working storage 50 is written back into its location in working storage 48.

In partial step (24) value W from the field of the same name in the working register is substracted from the contents of C-accumulator register 61. In partial step (25) the values from registers 61 and 62 are added, and the result is transferred to register 64. In partial step (26) the contents of register 64 are incremented to the next boundary in accordance with value Z. Subsequently, in partial step (27), value W′ from register 62 is again subtracted from value X in register 64 and the result is transferred to register 61. Finally, partial step (28) causes the contents of field W from register 50 to be added to the value in register 61.

Steps (24) to (28) as described above lead to the address of element I being updated, if necessary, according to its boundary type, with step (24) ensuring that an overhang for this element, if any, is utilized as shown for element M in FIG. 5D. Partial steps (25) to (27) are necessary because the boundary characteristic of the addresses associated with the elements is governed by the virtual beginning of the substructure. This is due to the fact that the highest boundary type within the substructure determines the boundary type of the whole set. The next boundary of this type to the left of the first element of the substructure is the so-called virtual beginning of the substructure. The address of the virtual beginning is called the virtual start address. At this address the substructure is invoked in storage when the data of the substructure are to be processed during the program.

The distance between the virtual start address of the substructure and the address of the first element of the substructure is overhang W′ which is stored in each case in register 62 in the last partial step (13). Before the next boundary in accordance with characteristic value Z of element I is searched in partial step (26) the address status is to be incremented by value W′ in step (25). The address incrementation by W′ is subsequently reversed in partial step (27) as the overhang of the substructure must not be considered for the subsequent operations. However, partial step (28) considers any overhang which the element to be processed may have. In this case, too, the determination of the boundary is dependent upon the virtual beginning, although this is only significant for a substructure which is to be treated as an element within a substructure of a higher level or as an element within a structure.

Figure 7:
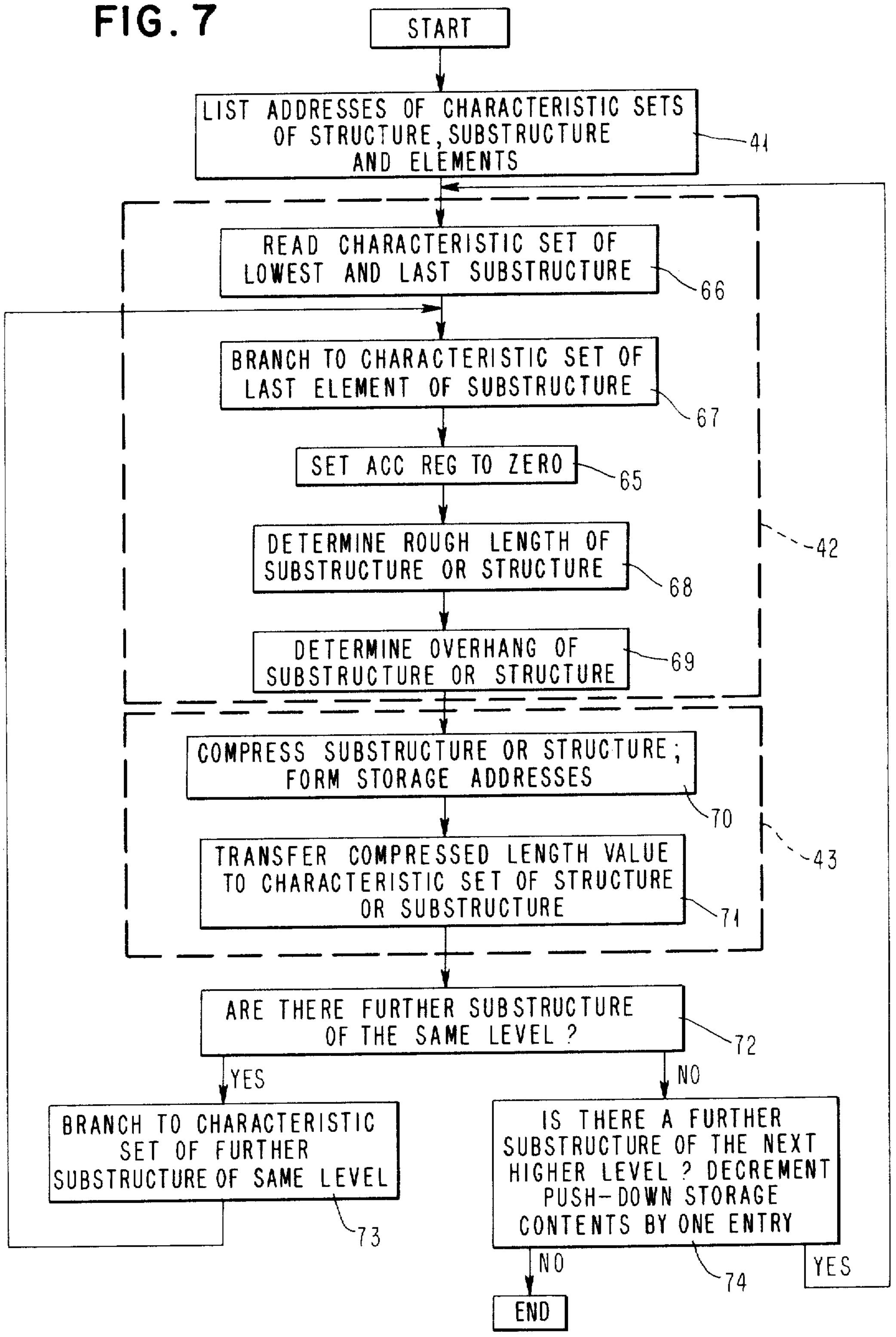
FIG. 7 is a detailed flow chart of the method of FIG. 1.

As in the present example the contents of register W′ and the contents of characteristic fields W and Z are both zero, the value C formed in accumulator register 61 in partial step (22) is not affected by partial steps (24) to (28). During the second run of the cycle this value is transferred to address field EA of working register 50 in partial step (21). Thus, the characteristic set of element I contains the value 64 in field EA. In partial step (22) length value 57 from field L of characteristic set I is added to the contents of register 61. The accumulator register then stores the value 121. In the subsequent partial step (23) it is determined that there is no further characteristic set so that updating steps (24) to (28) need not be performed. This completes step 70 (FIG. 7). A check of the C length values from the last partial step (2) of step 68 and from partial step (22) shows that the total length of substructure U5 could be reduced by 7 bytes while observing the storage boundary requirements.

Figure 12:
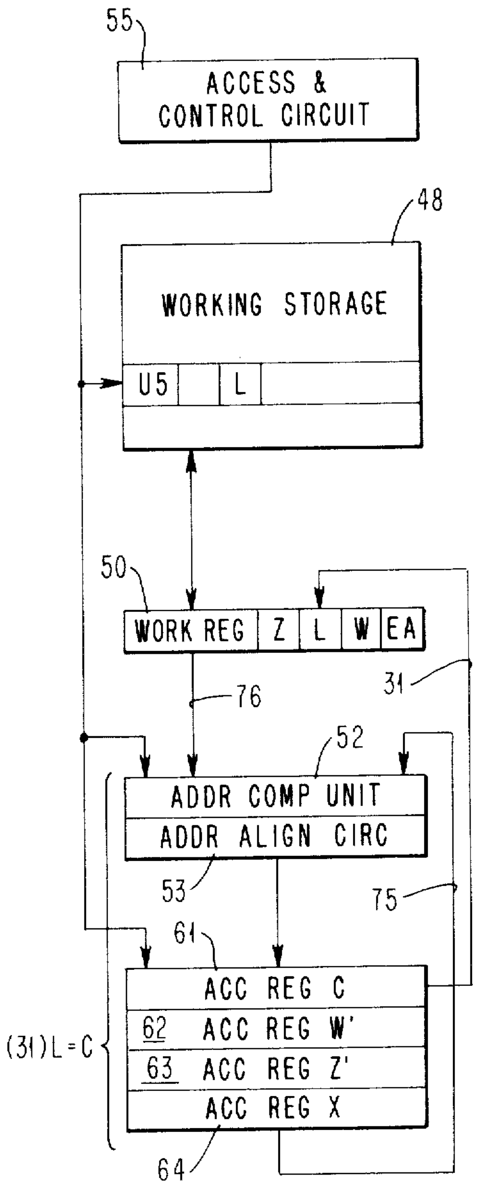
FIG. 12 is a block diagram showing the determination of the total length of a structure processed by means of the method of FIGS. 1 and 7.

In step 71 the value of the total length of the substructure is transferred to its characteristic set. To this end the characteristic set of substructure U5 in working storage 48 is again addressed by means of access control 55, utilizing the last entry in push-down storage 54, and is transferred to working register 50 (FIG. 12). In partial step (31) the contents of C-accumulator register 61 are transferred to field L of register 50. Subsequently, characteristic set U5 contains the value 121 as a length value.

Compress phase 43 for substructure U5 having thus been completed, it is checked in step 72 by means of field PV in the characteristic set of substructure U5 whether there is a chaining address to a further substructure of the same level. In the present example such an address exists as field PV of substructure U5 contains chaining address PU4. The "yes" exit of step 72 leads up to step 73 in which characteristic set U4 in storage 48 is searched by means of chaining address PU4. After step 73 steps 67 to 69 and subsequently steps 70 and 71 are repeated in the same manner as described in connection with substructure U4. The resulting values for fields Z, L, W, and EA are shown in field (*b*) of Table IV.

After substructure U4 has been processed, steps 67 to 71 are repeated for substructure U2 which similar to substructures U5 and U4 belongs to level 3. After this substructure has been fully processed as shown in Table IV, field (*c*), it is determined in step 72 that there is no further substructure of the same level. Therefore, step 74 is executed in which it is checked whether there are further substructures at the next higher level. To this end access circuit 55 accesses push-down storage 54 to reduce the contents of this storage by one entry and to find an entry of the next higher level. In the present example such an entry exists. The "yes" exit of step 74 leads back to step 66 in which address PU3 of substructure U3 is transferred from push-down storage 54 to address register 49. Address PU3 is the address of the last substructure of level 2. This substructure comprises elements U4, G and U5. After access control circuit 55 has transferred the characteristic set of substructure U3 from working storage 48 to working register 50, step 67 branches to the last element of substructure U3, utilizing address PU5 from pointer field PL of the characteristic set of U3.

In this order and as explained above in connection with substructure U5 steps 68 and 69 of the load phase 42 and steps 70 and 71 of the compress phase 43 are executed for these substructures. The resulting number values are shown in field (d) of Table IV.

Substructure U1 and subsequently structure S are also processed in this way, as is shown in fields (*e*) and (*f*) of Table IV. FIGS. 13A to F serve to explain the result values which were entered into fields EA, W, L, and Z of the characteristic sets in storage 48 during processing cycles (*a*) to (*f*). As is shown in these figures, partial step (13) of substructure U2 yielded an overhang W = 7 which has to be considered in cycle (*e*) during the processing of substructure U1. During loading, while handling characteristic set U2 in partial step (1), the overhang is added to accumulator value C, so yielding C = 9 + 7 = 16. As this value represents a double word boundary, it is not changed in partial step (2). This partial step rather causes C-value 16 to be decremented by overhang 7 to 9. After characteristic set B containing a 0-entry for W has been processed, a C-value of 20 results which is buffered in register 64 in partial step (11). In the succeeding partial step (12) the next boundary has the address value 24, so that partial step (15) yields the difference value 4 in W'-register 62. In partial step (15) this value is transferred as overhang W to the field of the same name in register 50.

Figures 13A, 13B, 13C, 13D, 13E, 13F:
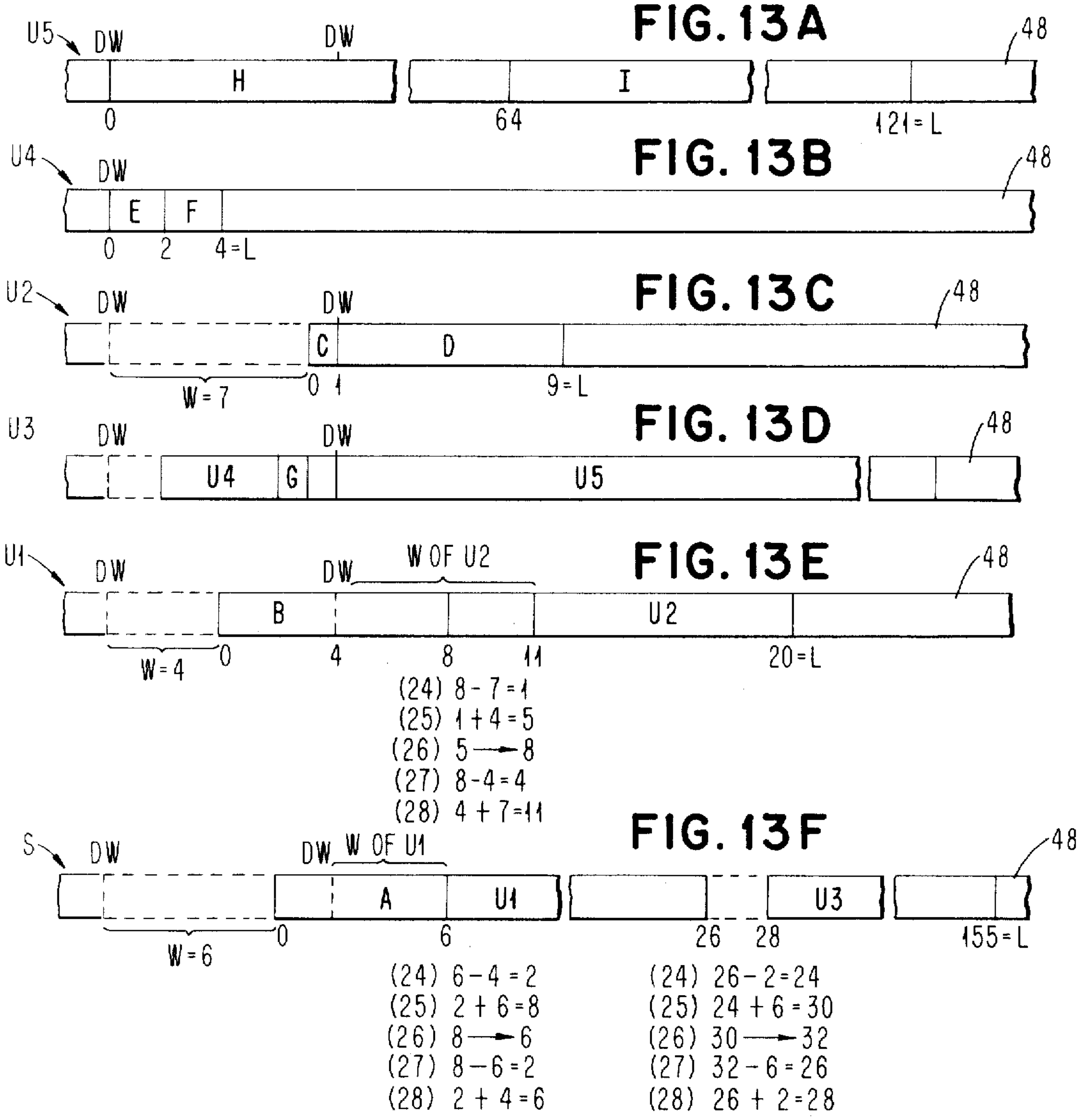
FIGS. 13A to 13F show a diagrammatic representation serving to explain the results of the method by means of a numerical example.

How overhang 7 is considered in characteristic set U2 in compress step 70 is shown in FIG. 13E depicting partial steps (24) to (28) for this characteristic set. These partial steps cause the virtual beginning of U2 to be at double word boundary 4 (at W = 4 for U1) and the actual beginning of U2 to be associated with relative address 11. FIG. 13F in connection with section (f) of Table IV shows how overhang values W and W' are considered in compress step 71 of structure S. After this step has been completed, length value 155, as the total length of the structure, is stored in the length field of the characteristic set of S. A comparison of the sum of 149 of all the length values in Table III shows that the required storage location merely contains 6 blank positions.

TABLE V

| N | Y | R | V | Z | L | W | EA | PL | PV |
|---|---|---|---|---|---|---|---|---|---|
| S | 2 | 1 | 3 | 7 | 155 | 6 | 0 | PU3 | |
| A | 0 | 2 | 1 | 0 | 6 | 0 | 0 | | |
| U1 | 1 | 2 | 0 | 7 | 20 | 4 | 6 | PU2 | |
| B | 0 | 3 | 1 | 3 | 8 | 0 | 0 | | |
| U2 | 1 | 3 | 2 | 7 | 9 | 7 | 11 | PD | |
| C | 0 | 4 | 1 | 0 | 1 | 0 | 0 | | |
| D | 0 | 4 | 2 | 7 | 8 | 0 | 1 | | |
| U3 | 1 | 2 | 2 | 7 | 127 | 2 | 28 | PU5 | PU1 |
| U4 | 1 | 3 | 1 | 1 | 4 | 0 | 0 | PF | PU2 |
| E | 0 | 4 | 1 | 1 | 2 | 0 | 0 | | |
| F | 0 | 4 | 2 | 1 | 2 | 0 | 2 | | |
| G | 0 | 3 | 0 | 0 | 1 | 0 | 4 | | |
| U5 | 1 | 3 | 2 | 7 | 121 | 0 | 6 | PI | PU4 |
| H | 0 | 4 | 1 | 7 | 64 | 0 | 0 | | |
| I | 0 | 4 | 2 | 0 | 57 | 0 | 64 | | |

The NO-output signal in step 74 determining that there are no further entries in the push-down storage indicates that all characteristic sets have been processed. Table V shows the contents of storage 48 after all characteristic sets have been processed. At this stage the characteristic sets of structure S are covered with a network of relative addresses. In a subsequent operation which is not an object of the invention the final storage addresses at which the elements of structure S are loaded into the storage of a data processing system can be readily generated from the relative addresses EA and overhang values W.

Address Alignment Circuit

Figure 14:
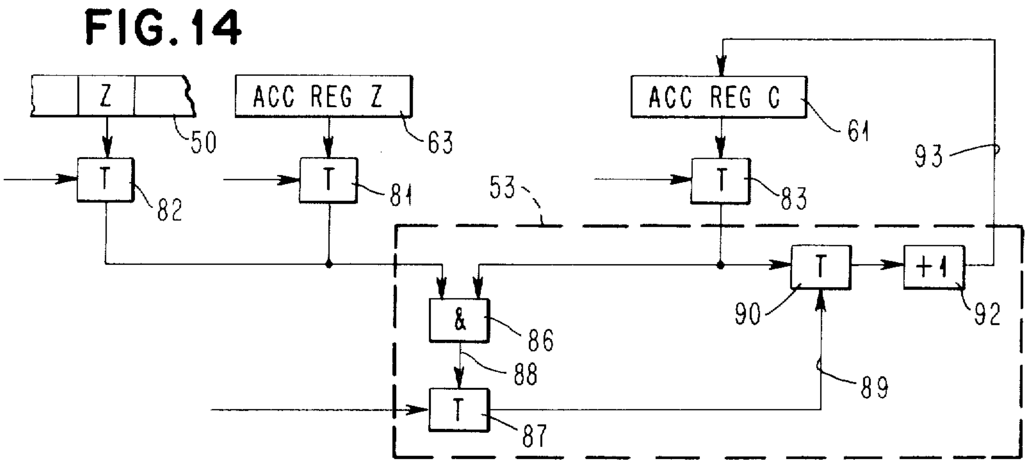
FIG. 14 shows a block diagram of the address alignment circuit, as is used in the arrangement of FIG. 2.

FIG. 14 shows the typical layout of address alignment circuit 53. This circuit comprises an AND circuit 86, one input of which, via gate circuit 81, is connected to the last three bit positions of the output of accumulator register 63 containing the current characteristic value Z' for the boundary type. Via gate circuit 82 the contents of field Z in register 50 can be applied to the same input. The other input of AND circuit 86 is linked, via gate circuit 83, with the last three bit positions on the output of C-accumulator register 61. The result of the accumulated characteristic length values in steps 68 to 70 of FIG. 7 is contained in this register in binary notation. As in step 70 the contents of register 61 are stored as an address value in the EA-fields of the characteristic data sets, the last three positions of the register contents necessarily denote a boundary respectively corresponding to the boundary type of the element and the greatest boundary type of the respective substructure or structure. Thus, the contents of the last three positions of register 61 must be 000 (a number dividable by 8) for the "double word" boundary type, 000 or 100 (a number dividable by 4) for the "full word" boundary type, and 000, 100, or 110 (a number dividable by 2) for the "half-word" boundary type, whereas for the "byte" boundary type a combinations of the last three binary positions of the contents of register 61 are permissible.

Register 61 is set to the corresponding boundary as a function of a masking circuit consisting of a compare circuit formed by AND circuit 86 and of gate circuit 87 which is controlled by the compare circuit. The compare circuit fulfills the AND function for binary 1-signals for each of the three input line pairs from registers 63 and 61. To this end circuits 81, 82, 86 comprise a gate and an AND circuit, respectively, for each digit or digit pair. As long as there is a binary 1 on the two inputs of one of the input line pairs (outputs of bit positions of the same order in registers 61 and 63), AND circuit 86 supplies a control signal to gate circuit 87 on line 88, by means of which gate circuit 87 is opened to pass clock signals to control line 89 which is linked with gate circuit 90. Register 61 comprises an incrementing circuit 92 controlled by gate circuit 90. Together with the output of the three lowest binary positions of register 61 and the input of these binary positions gate circuit 90 and incrementing circuit 92 form a loop via line 93. If gate circuit 90 is opened by clock signals from control line 89, the contents of the three lowest binary positions of register 61 are led through incrementing circuit 92, where they are incremented by 1, and are subsequently transferred back to the same register positions via line 93.

The binary ones of the characteristic values of the boundary types in register 63, as described in connection with FIG. 4, act as masking bits for the three lowest positions of accumulator register 61. As long as there is a 1 in the masked position, the contents of this register are incremented as a function of incrementing circuit 92. To this end the characteristic values of the boundary types are selected in such a manner that they are in each case lower by 1 than the actual boundary. Thus, for example, the characteristic value of the double word boundary type is 7 (binary 111), whereas the address value of the boundary is in each case a number dividable by 8, whose last three positions contain a 0.

Details of the layout of incrementing circuit 92 are known to those skilled in the art. The same holds for the address computing unit of FIGS. 2 and 9 to 12, so that further explanations have been omitted.

Access and Control Circuit

Figure 15:
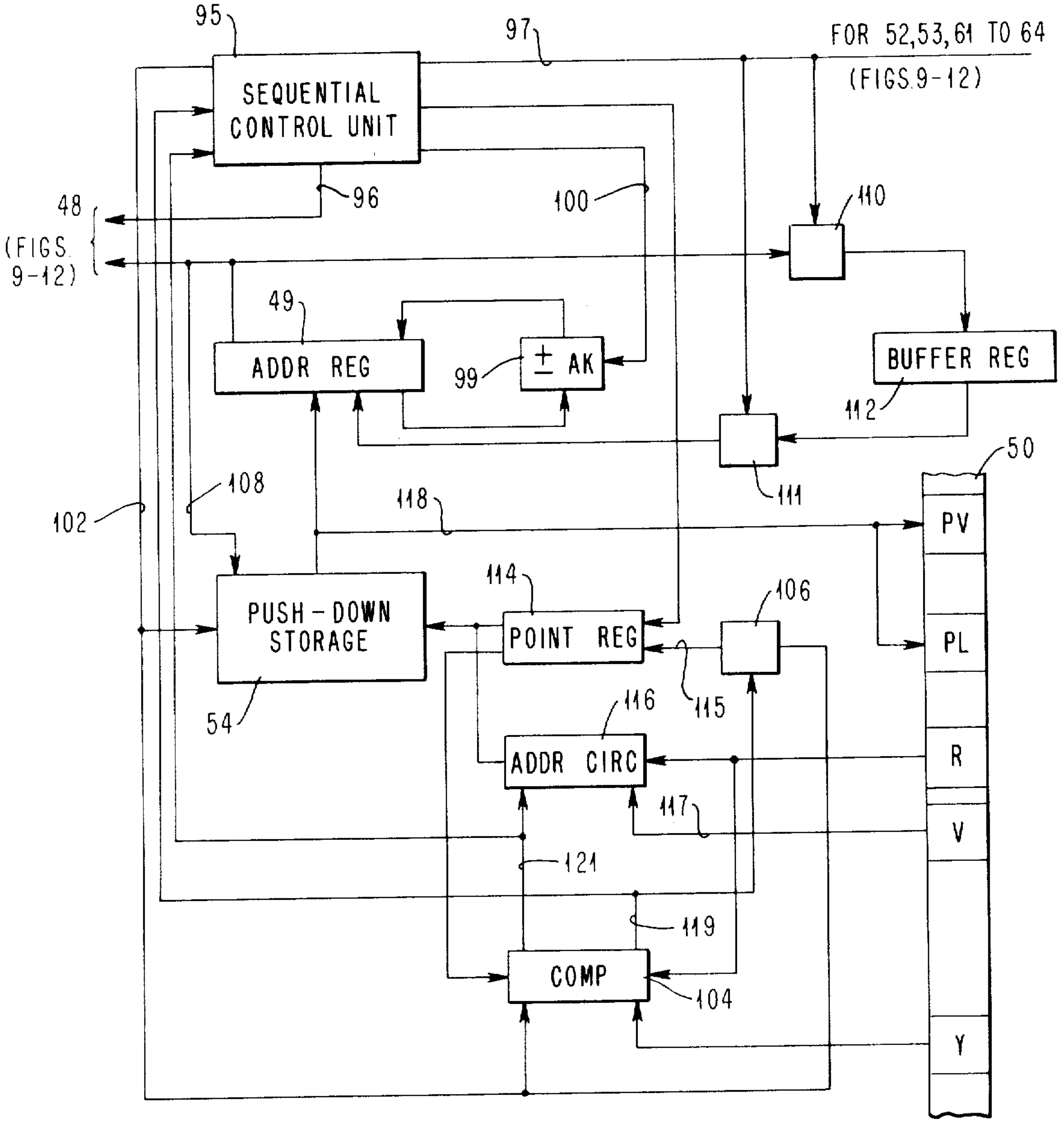
FIG. 15 is a simplified block diagram of the access and control circuit of FIG. 1.

FIG. 15 is a simplified representation of an embodiment of the access and control circuit 55 of FIG. 1. This circuit comprises a sequential control unit 95 controlling the operational phases and partial steps of the method described. The sequential control unit may consist, for exmaple, of circuits similar to those described in German Patent No. 1,285,219 (U.S. Pat. No. 3,366,929). The sequential control unit may also take the form of a known program control unit which as a function of the control data contained in a storage provides the necessary control signals for the operation of the circuit of FIG. 2. For the address computing unit 52 and the address alignment circuit 53 sequential control unit 95 generates operation control signals on bus 97 as well as transfer control signals for registers 50 and 61 to 64. The operation control signals for working storage 48 are generated on control line 96. Address register 49 of this storage is linked with incrementing-/decrementing circuit 99 which is activated by sequential control unit 95 via line 100 to increment or decrement the address in address register 49 by a predetermined constant AK. Address increment AK corresponds to the length of a characteristic set 45 in working storage 48. Incrementation is carried out each time a characteristic set is read from working storage 48 in compress step 70. As step 68 is executed on the other hand, the address value in address register 49 is decremented by the address constant AK each time a characteristic set is read from storage 48.

A bus 102 from sequential control unit 95 controls push-down storage 54 for read or write operations. The same control line also supplies control signals to a compare circuit 104 and input signals to a gate circuit 106. The output of push-down storage 54 is connected to the input of address register 49, whereas the output of the latter is connected to storage 48 on the one hand and rerouted to the input of push-down storage 54 on the other. Via gate circuit 110, the output of address register 49 is also linked with a buffer register 112, whose output is rerouted to the input of address register 49 via gate circuit 111.

Push-down storage 54 is addressed via the contents of a pointer register 114 to which an incrementing signal is applied via line 115. In addition, pointer register 114 receives decrementing signals DK from sequential control unit 95 via line 113. The latter signals are applied in step 74 after all structures of a level have been processed and when processing is to start on the next higher level, if any.

Push-down storage 54 can be additionally addressed via an addressing circuit 116 connected to field R of working register 50 and which is activated via line 117 as a function of the contents of field V of working register 50. These operations are carried out if the characteristic set of the last element of a structure has been read from storage 48 in listing step 41. Such an element includes the value 2 in field V, with said value being determined via a detection circuit (not shown) serving to trigger a control signal on line 117. Subsequently, the address of the characteristic set of the substructure to which the last element belongs in each case is searched in accordance with the contents of field R via addressing circuit 116 in push-down storage 54. Via bus 118 and gates (not shown) controlled by sequential control unit 95, this address is transferred to field PL of working register 50. As a result of the control signal from line 117, addressing circuit 116 performs a convert operation to derive from the level value of the corresponding element the level value of the appertaining substructure, which is lower by 1.

Compare circuit 104 serves to compare the contents of pointer register 114 with the contents of field R of working register 50. Compare circuit 104 is conditioned during listing step 41 by a signal from bus 102. The latter circuit is activated when the value 1 or 2 occurs in field Y of working register 50, which indicates that the characteristic set of a structure or substructure has been read from working storage 48. Then the status of pointer register 114 is compared with the contents of field R. If field R contains a value exceeding the contents of pointer register 114, compare circuit 104, via line 119, supplies a control signal to gate circuit 106, causing the latter to pass an incrementing signal IK from sequential control unit 95 to pointer register 114, by means of which the status of the latter register is incremented to the address of the next push-down storage entry. In sequential ontrol unit 95 the signal on line 119 triggers a write signal for the push-down storage on bus 102, so that the contents of address register 49, representing the address of the characteristic set of the corresponding structure or substructure, is written as a new entry into push-down storage.

If, on the other hand, value R equals the respective status of pointer register 114, a control signal from the compare circuit is led to addressing circuit 116 via line 121, said signal activating addressing circuit 116 to pass the contents unchanged from field R to push-down storage 54. The signal on line 121 also triggers a read signal for push-down storage 54 on bus 102, so causing the last push-down storage entry to be read. This entry which is the address of the characteristic set of the preceding structure of the same level is transferred as a chaining address, via bus 118, to field PV of working register 50.

In step 69 gate circuit 110 receives a control signal from sequential control unit 96, by means of which the contents of address register 49 are transferred to buffer register 112. This causes the address of the characteristic set of the substructure of structure handled in step 68 to be buffered. For step 71 gate circuit 111 is opened by sequential control unit 96 to again transfer the buffered value to address register 49. This leads to the characteristic set of the respective substructure or structure being accessed to store the determined length value in field L of this characteristic set.

While the invention has been particularly shown and described with reference to a preferred embodiment thereof, it will be understood by those skilled in the art that various changes in form and detail may be made therein without departing from the spirit and scope of the invention.

What is claimed is:

1. Apparatus for automatically allocating storage addresses to a group of data elements of varying lengths, comprising:

storage means for storing characteristic data sets denoting characteristics of said data elements, each data set containing data fields comprising a length value denoting the length of the associated data element and a characteristic value denoting the boundary type of the associated data element;

a working register connected to said storage means for buffering a characteristic data set;

control means connected to said storage means and said working register for loading said characteristic data sets serially in said working register;

an accumulator register connected to said working register for accumulating each length value from each data set buffered in said working register;

an address computing unit linked with positions of said working register and said accumulator register;

and an address alignment circuit for comparing the contents of said accumulator register with each said characteristic value buffered in said working register and incrementing said contents according to each said characteristic value so as to correspond to the boundary type denoted thereby.

2. Apparatus in accordance with claim 1, wherein said address alignment circuit comprises a masking circuit for the lowest positions of said accumulator register, said masking circuit responding to predetermined bits in each characteristic value; an incrementing circuit connected to said accumulator register; and said masking circuit comprising a control signal output for actuating said incrementing circuit and which, in accordance with a logic function, carries a signal as long as there is a predetermined bit in one of the masked positions of said accumulator register.

3. Apparatus in accordance with claim 2 comprising:

a further register for buffering the characteristic value Z' of the greatest boundary type of said data elements, means for comparing said characteristic value Z' with each characteristic value Z in said working register and means for setting said value Z' to a new value corresponding to that of Z whenever the value of Z being compared is greater than that of Z'.

4. Apparatus in accordance with claim 3 comprising:

means for selectively coupling said further register with said masking circuit and said incrementing circuit to set the contents of said accumulator register to a storage boundary associated with said group as a start address.

5. Apparatus in accordance with claim 1 wherein saio control means comprises:

a push-down storage for storing the addresses of characteristic data sets characterizing substructures of said group of data elements, and addressing means responsive to each address in said push-down storage for loading said data set addressed thereby into said working register.

* * * * *